United States Patent [19]

Snelgrove

[11] Patent Number: 5,539,786
[45] Date of Patent: Jul. 23, 1996

[54] DIGITAL CIRCUIT FOR GENERATING A CLOCK SIGNAL

[75] Inventor: Andrew H. Snelgrove, Ventura, Calif.

[73] Assignee: The United States of America as represented by the Secretary of the Navy, Washington, D.C.

[21] Appl. No.: 521,385

[22] Filed: Jul. 31, 1995

[51] Int. Cl.$^6$ ........................................... H03D 3/24
[52] U.S. Cl. ..................... 375/373; 375/355; 326/93; 326/96
[58] Field of Search ................................ 375/371, 373, 375/362, 363, 364, 354, 355; 327/141–142; 326/93, 96; 331/14

[56] References Cited

U.S. PATENT DOCUMENTS

| | | | |
|---|---|---|---|
| 3,980,820 | 9/1976 | Niemi et al. | 375/373 |
| 4,716,578 | 12/1987 | Wight | 375/354 |
| 5,128,970 | 7/1992 | Murphy | 375/354 |
| 5,402,453 | 3/1995 | Vavreck et al. | 375/373 |

*Primary Examiner*—Stephen Chin
*Assistant Examiner*—Thuy L. Nguyen
*Attorney, Agent, or Firm*—David S. Kalmbaugh; Melvin J. Sliwka

[57] ABSTRACT

A digital circuit comprising a pair of D Flip-Flops which synchronize an incoming NRZ_L serial data stream to an external ten megahertz clock signal. The combination of a third D Flip-Flop and an EXCLUSIVE-NOR gate generates a clear pulse whenever a change of state occurs within the synchronized serial data stream. This clear pulse is supplied to a ten state state machine resetting the state machine to state S0. When the state machine transition to state S4 the state machine generates an enable signal which is supplied to a toggle Flip-Flop enabling the Flip-Flop allowing the Flip-Flop to change state. The ten megahertz clock signal then clocks the toggle Flip-Flop causing the Flip-Flop to change state. At state S9 the state machine again provides an enable signal to the toggle Flip-Flop enabling the toggle Flip-Flop which allows the ten megahertz clock signal to change the state of the output of the toggle Flip-Flop. This results in one megahertz clock signal at the output of the toggle Flip-Flop which is synchronized to the incoming serial data stream.

15 Claims, 2 Drawing Sheets

5,539,786

DIGITAL CIRCUIT FOR GENERATING A CLOCK SIGNAL

BACKGROUND OF THE INVENTION

1. Field of the Invention

The present invention relates generally to the field of digital data processing circuits. Specifically, the present invention relates to a digital circuit which receives a serial data stream and then generates a clock signal which is synchronized to the serial data stream.

2. Description of the Prior Art

In missile telemetry systems there is a need to extract from an incoming Non-Return-To-Zero-Level (NRZ-L) serial data stream the frame sync words. The extraction of these frame sync words is performed by a decommutator located at a receiving station. The decommutator requires a co-incident clock signal to extract the frame sync words from the incoming Non-Return-To-Zero-Level serial data stream. Since there is only one channel available to transmit NRZ_L data from the missile's telemetry system to the receiving station, the co-incident clock signal must be generated at the receiving station.

With this disadvantage known to the transmission of NRZ_L data from a missile to a receiving station, the present invention was conceived and one of its objects is to provide a relatively simple and highly efficient digital circuit for generating a clock signal at a receiving station which is synchronized to an incoming NRZ_L data stream.

Another object of the present invention is to provide a relatively simple yet highly reliable digital circuit which is adaptable to any communication systems which requires the synchronization of the clock signal to the data stream.

Various other advantages and objectives of the present invention will become more apparent to those skilled in the art as a more detailed description of the invention is set forth below.

SUMMARY OF THE INVENTION

The digital circuit of the present invention includes a pair of D Flip-Flops which synchronize an incoming NRZ_L serial data stream to an external ten megahertz clock signal. The combination of a third D Flip-Flop and an EXCLU-SIVE-NOR gate generates a clear pulse whenever a change of state occurs within the synchronized serial data stream. This clear pulse is supplied to a ten state state machine resetting the state machine to state S0. When the state machine transition to state S4 the state machine generates a logic one enable signal which is supplied to a toggle Flip-Flop enabling the Flip-Flop allowing the Flip-Flop to change state. The ten megahertz clock signal then clocks the toggle Flip-Flop causing the Flip-Flop to change state. At state S9 the state machine again provides a logic one enable signal to the toggle Flip-Flop enabling the toggle Flip-Flop which allows the ten megahertz clock signal to change the state of the output of the toggle Flip-Flop. This results in a one megahertz clock signal at the output of the toggle Flip-Flop which is synchronized to the incoming serial data stream.

DETAILED DESCRIPTION OF THE PREFERRED EMBODIMENT

Figure 1:
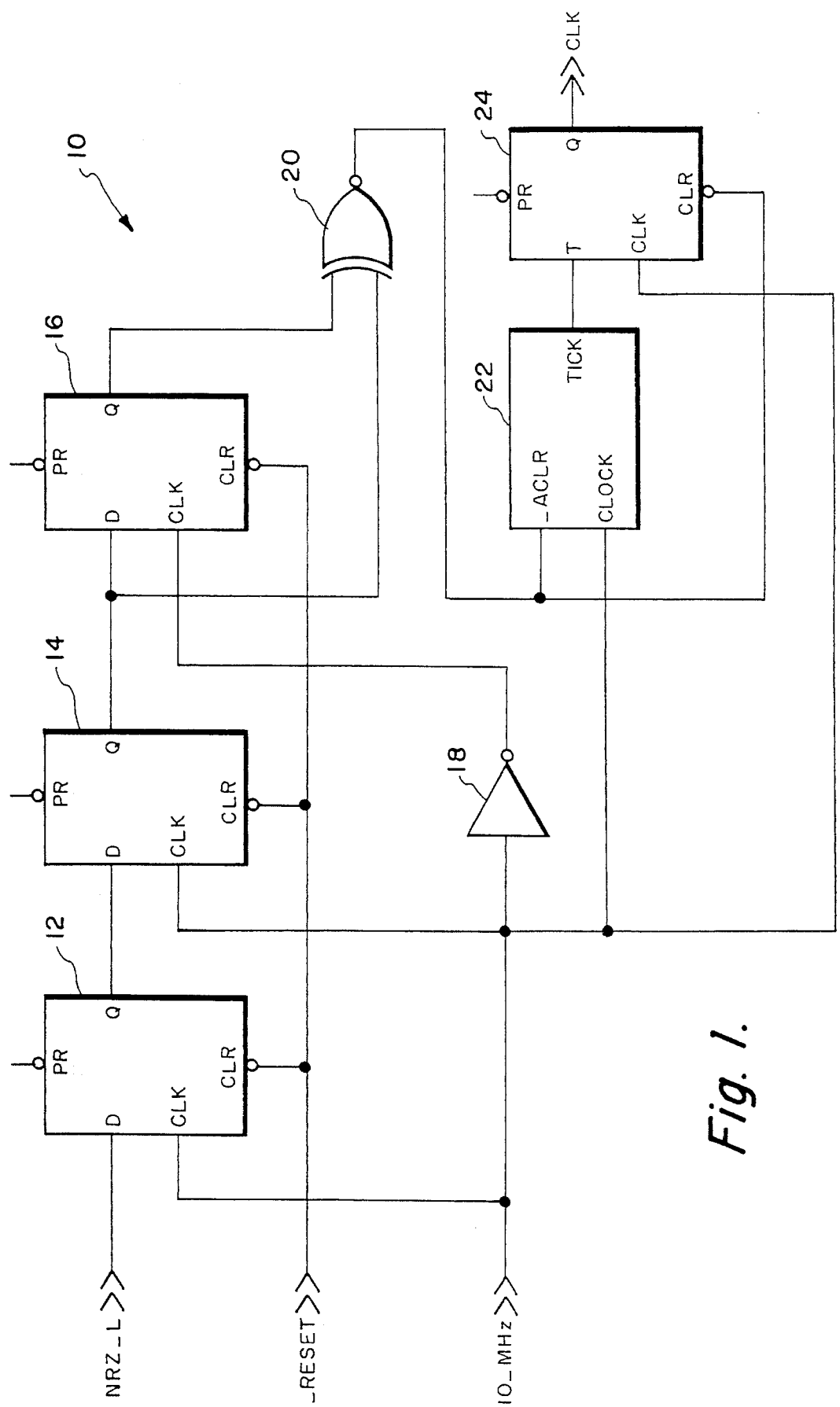
FIG. 1 is a detailed logic diagram of the digital circuit constituting the present invention.
Figure 2:
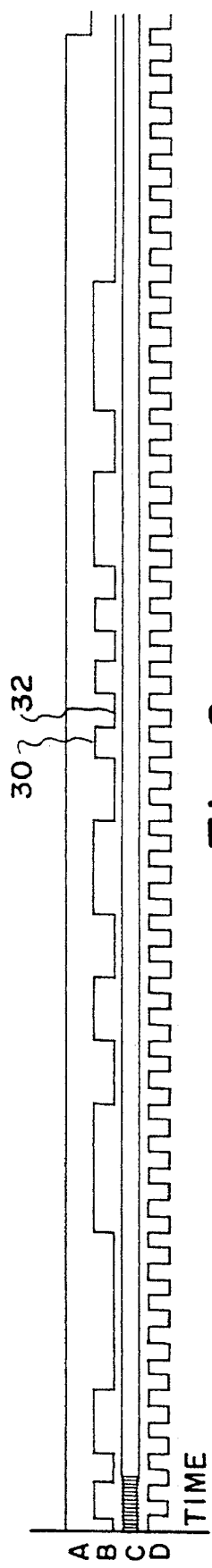
FIG. 2 is a timing diagram illustrating a first example of some of the waveforms occurring within the digital circuit of FIG. 1 when a clock signal is synchronized to an incoming data stream.

Referring to FIG. 1, there is shown a digital circuit 10, which receives a serial data stream (FIG. 2B, FIG. 3B and FIG. 4A) of data bits from a missile or the like at its NRZ_L input. The data provided at the NRZ_L input of circuit 10 is a pulse code modulated data stream which has a code definition of Non-Return-To-Zero-Level (NRZ-L). In Non-Return-To-Zero-Level data a "ONE" is represented by one level and a "ZERO" is represented by an another level. Thus, for example, in FIG. 2, data bit 30 is a "ONE" and data bit 32 is a "ZERO".

Figure 3:
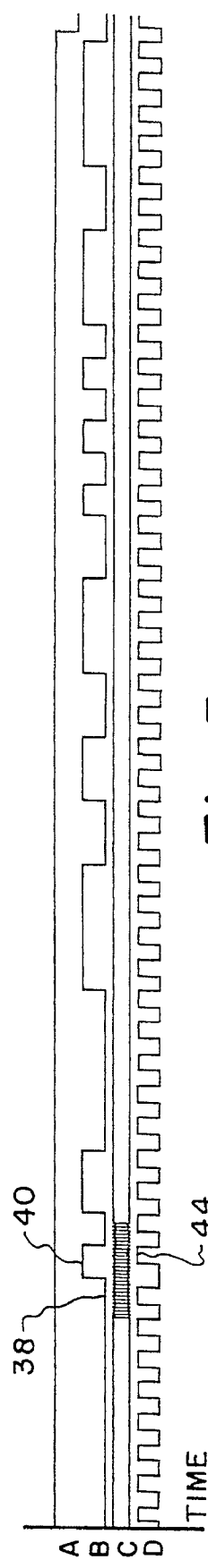
FIG. 3 is a timing diagram illustrating a second example of some of the waveforms occurring within the digital circuit of FIG. 1 when a clock signal is synchronized to an incoming data stream.
Figure 4:
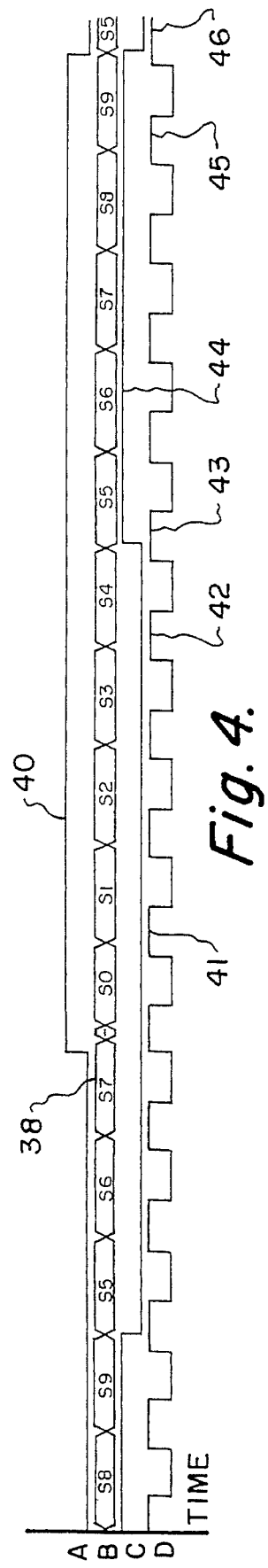
FIG. 4 is an enlarged timing diagram of a portion of the timing diagram of FIG. 3.

Referring now to FIGS. 1, 3 and 4, the NRZ_L serial data stream of FIG. 3B is supplied through the NRZ_L input of circuit 10 to the D (data) input of a Flip-Flop 12. A 10 megahertz clock signal from an external source (not illustrated) is provided through the 10_MHz input of circuit 10 to the CLK (clock) input of Flip-Flop 12. The 10 megahertz clock signal first clocks the NRZ_L serial data stream of FIG. 3B through Flip-Flop 12 and then through Flip-Flop 14 to the D input of Flip-Flop 16. The pair of Flip-Flops 12 and 14 synchronize the NRZ_L serial data stream of FIG. 3B to the ten megahertz clock signal.

It should be noted that the NRZ_L serial data stream of FIG. 3B from the missile's telemetry system is supplied to the NRZ_L input of circuit 10 at a frequency of one megahertz.

At the occurrence of a transition in the NRZ_L data stream such as the transition which occurs between data bits 38 and 40 of the NRZ_L serial data stream of FIG. 3B, the output of EXCLUSIVE-NOR gate 20 will transition from the logic one state to the logic zero state. The leading edge of a clock pulse of the 10 megahertz clock signal will first clock Bit 38 to the Q output of Flip-Flop 14. The trailing edge of this clock pulse will next clock Bit 38 through Flip-Flop 16 to its Q output. This results in a logic zero being supplied to the first input of EXCLUSIVE-NOR gate 20. The next clock pulse of the 10 megahertz clock signal will clock Bit 40 through Flip-Flop 14 to the second input of EXCLUSIVE-NOR gate 20 resulting in a logic one to the second input of EXCLUSIVE-NOR gate 20. This, in turn, results in a logic zero asynchronous clear pulse at the output of EXCLUSIVE-NOR gate 20 for one half of a clock cycle. This logic zero clear pulse is supplied to the _ACLR input of a ten state state machine 22. This logic zero clear pulse is also supplied to the CLR (clear) input of a Toggle Flip-Flop 24 resetting the Q output of Flip-Flop 24 to the logic zero state.

After state machine 22 is reset by the asynchronous clear pulse to state S0, the clock pulse 41 of the 10 megahertz clock signal (FIG. 4D) will clock state machine 22 from state S0 to state S1 as shown in FIG. 4B. Successive clock pulses of the clock signal of FIG. 4D clock the state machine 22 through states S2, and S3. When clock pulse 42 (FIG. 4D)

clocks state machine 22 from state S3 to state S4 a logic one is provided at the TICK output of state machine 22. This logic one is supplied to the T (toggle) input of Flip-Flop 24. The next clock pulse 43 of the clock signal of FIG. 4D toggles the Q output of Flip-Flop 24 to the logic one state, which is the logic zero to logic one transition of clock pulse 44 of the one megahertz clock signal of FIG. 4C.

The 10 megahertz clock signal of FIG. 4D continues to clock state machine 22 from state S4 through states S5, S6, S7 and S8. Clock pulse 45 (FIG. 4D) next clocks state machine 22 from S8 to state S9 (FIG. 4B). When state machine 22 is clocked to state S9, state machine 22 provides at its TICK output a logic one. This logic one is supplied to the T input of Flip-Flop 24. Clock pulse 46 of the 10 megahertz clock signal of FIG. 4D next clocks this logic one through Flip-Flop 24 to its Q output. This is the logic one to zero transition of clock pulse 44 of the one megahertz clock signal of FIG. 4C. As is best illustrated by the timing waveforms of FIG. 3, the one megahertz clock signal of FIG. 3D is now synchronized to the incoming data stream which is illustrated in FIG. 3B.

It should be noted that the waveform of FIG. 3A is a logic zero reset signal which is supplied to the CLR inputs of Flip-Flops 12, 14 and 16. In addition, the waveform of FIG. 4B which depicts the state of state machine 22 verses time is an enlargement of the waveform of FIG. 3C. occurring when the one megahertz clock signal (FIGS. 3D and 4C) is synchronized to the incoming data stream illustrated in FIGS. 3B and 4A.

Appendix A is a program listing for the state machine 22. At states S4 and S9 a logic one is provided at the TICK output of state machine 22 which when supplied to the T input of Flip-Flop 24 allows the 10 megahertz clock signal to toggle (change the state of) the Q output of Flip-Flop 24. As is best illustrated by Appendix A state machine 22 branches from state S9 to state S5 unless state machine is reset to state S0 by an asynchronous clear pulse supplied by EXCLUSIVE-NOR gate 20 to the _ACLR input of state machine 22. Only during a logic zero to one transition of the incoming data stream (the transition from data bit 38 to bit 40 illustrated in FIG. 3B) or a logic one to zero transition (the transition from data bit 30 to data bit 32 illustrated in FIG. 2B) is an asynchronous clear pulse supplied by EXCLUSIVE-NOR gate 20 to the _ACLR input of state machine 22.

The digital logic illustrated in FIG. 1 was implemented using an Erasable Programmable Logic Device manufactured by the ALTERA Corporation of San Jose, Calif. Any of the 5000 series Erasable Programmable Logic Devices, such as the EPM5128 or the EPM5130 manufactured by the ALTERA Corporation may be used to implement the digital logic of FIG. 1. The ALTERA Corporation MAX+PLUS AHDL software implements the logic elements of FIG. 1 as well as the state machine functions of Appendix A.

From the foregoing, it may readily be seen that the present invention comprises a new, unique and exceedingly useful digital circuit for synchronizing a clock signal to an incoming data stream. Obviously, many modifications and variations of the present invention are possible in light of the above teachings. It is therefore to be understood that within the scope of the appended claims the invention may be practiced otherwise than as specifically described.

What is claimed is:

1. A digital circuit for generating a data clock signal, said digital circuit comprising:

synchronizing means for receiving a serial data stream and an externally generated clock signal, said synchronizing means placing said serial data stream in synchronization with said externally generated clock signal;

signal generating means coupled to said synchronizing means to receive said serial data stream from said synchronizing means, said signal generating means, responsive to said externally generated clock signal, generating a clear pulse signal whenever said serially data stream changes state from one logic state to another logic state;

a state machine having a clock input for receiving said externally generated clock signal, an asynchronous clear input coupled to said signal generating means for receiving said clear pulse signal and an enable output;

said state machine being reset to a first predetermined state by said clear pulse signal, said state machine generating an enable pulse signal whenever said state machine is clocked to a second predetermined state, said state machine generating said enable pulse signal whenever said state machine is clocked to a third predetermined state; and flip-flop means connected to the enable output of said state machine to receive said enable pulse signal, said flip-flop means receiving said externally generating clock signal;

said flip-flop means responsive to said enable pulse and said externally generating clock signal providing said data clock signal at a signal output of flip-flop means, said data clock signal being in synchronization with said serial data stream.

2. The digital circuit of claim 1 wherein said externally generated clock signal has a predetermined frequency of about one megahertz.

3. The digital circuit of claim 1 wherein said data clock signal has a predetermined frequency of about one megahertz.

4. The digital circuit of claim 1 wherein said synchronizing means comprises:

a first Flip-Flop having a data input for receiving said serial data stream, a clock input for receiving said externally generated clock signal and a Q output; and a second Flip-Flop having a data input connected to the Q output of said first Flip-Flop, a clock input for receiving said externally generated clock signal and a Q output connected to said signal generating means.

5. The digital circuit of claim 1 wherein said signal generating means comprises:

a D-type Flip-Flop having a data input connected to said synchronizing means, a clock input and a Q output;

an inverter having an input for receiving said externally generated clock signal and an output connected to the clock input of said D-type Flip-Flop; and an EXCLUSIVE-NOR gate having a first input connected to the said synchronizing means, a second input connected to the Q output of said D-type Flip-Flop and an output connected to the asynchronous clear input of said state machine and said flip-flop means.

6. A digital circuit for generating a data clock signal, said digital circuit comprising:

synchronizing means for receiving a serial data stream and an externally generated clock signal, said synchronizing means placing said serial data stream in synchronization with said externally generated clock signal;

signal generating means coupled to said synchronizing means to receive said serial data stream from said synchronizing means, said said signal generating means, responsive to said externally generated clock signal, generating a clear pulse signal whenever said serially data stream changes state from one logic state to another logic state;

a ten state state machine having a clock input for receiving said externally generated clock signal, an asynchronous clear input coupled to said signal generating means for receiving said clear pulse signal and an enable output; said ten state state machine being reset to a state S0 by said clear pulse signal, said ten state state machine generating an enable pulse signal whenever said ten state state machine is clocked to a state S4, said ten state state machine generating said enable pulse signal whenever said ten state state machine is clocked to a state S9; and a toggle Flip-Flop having a toggle input connected to the enable output of said ten state state machine, a clock input for receiving said externally generated clock signal, a clear input connected to said signal generating means for receiving said clear pulse signal and a Q output, said toggle Flip-Flop providing said data clock signal at the Q output of said toggle Flip-Flop.

7. The digital circuit of claim 6 wherein said externally generated clock signal has a predetermined frequency of about one megahertz.

8. The digital circuit of claim 6 wherein said data clock signal has a predetermined frequency of about one megahertz.

9. The digital circuit of claim 6 wherein said synchronizing means comprises:

a first D-type Flip-Flop having a data input for receiving said serial data stream, a clock input for receiving said externally generated clock signal and a Q output; and a second D-type Flip-Flop having a data input connected to the Q output of said first Flip-Flop, a clock input for receiving said externally generated clock signal and a Q output connected to said signal generating means.

10. The digital circuit of claim 6 wherein said signal generating means comprises:

a D-type Flip-Flop having a data input connected to said synchronizing means, a clock input and a Q output;

an inverter having an input for receiving said externally generated clock signal and an output connected to the clock input of said D-type Flip-Flop; and an EXCLUSIVE-NOR gate having a first input connected to the said synchronizing means, a second input connected to the Q output of said D-type Flip-Flop and an output connected to the asynchronous clear input of said ten state state machine and the clear input of said toggle Flip-Flop.

11. A digital circuit for generating a first clock signal, said digital circuit comprising:

a first Flip-Flop having a data input for receiving a serial data stream, a clock input for receiving a second clock signal, a clear input for receiving a reset signal and a Q output;

a second Flip-Flop having a data input connected to the Q output of said first Flip-Flop, a clock input for receiving said second clock signal, a clear input for receiving said reset signal and a Q output;

an inverter having an input for receiving said second clock signal and an output;

a third Flip-Flop having a data input connected to the Q output of said second Flip-Flop, a clock input connected to the output of said inverter, a clear input for receiving said reset signal and a Q output;

an EXCLUSIVE-NOR gate having a first input connected to the Q output of said second Flip-Flop, a second input connected to the Q output of said third Flip-Flop and an output;

a state machine having an asynchronous input connected to the output of said EXCLUSIVE-NOR gate, a clock input for receiving said second clock signal and an enable output; and a fourth Flip-Flop having a toggle input connected to the enable output of said state machine, a clock input for receiving said second clock signal, a clear input connected to the output of said EXCLUSIVE-NOR gate and a Q output, the Q output of said fourth Flip-Flop providing said first clock signal.

12. The digital circuit of claim 11 wherein said first clock signal has a predetermined frequency of about one megahertz.

13. The digital circuit of claim 11 wherein said second clock signal has a predetermined frequency of about one megahertz.

14. The digital circuit of claim 11 wherein said first, second and third Flip-Flops each comprise a D-type Flip-Flop.

15. The digital circuit of claim 11 wherein said fourth Flip-Flop comprises a toggle Flip-Flop.

* * * * *